_United States Patent_ [19] [11] Patent Number: 5,969,764
Sun et al. [45] Date of Patent: Oct. 19, 1999

[54] ADAPTIVE VIDEO CODING METHOD

[75] Inventors: Huifang Sun, Cranbury, N.J.; Anthony Vetro, Staten Island, N.Y.

[73] Assignee: Mitsubishi Electric Information Technology Center America, Inc., Cambridge, Mass.

[21] Appl. No.: 08/896,867

[22] Filed: Jul. 18, 1997

Related U.S. Application Data

[63] Continuation-in-part of application No. 08/800,880, Feb. 14, 1997, Pat. No. 5,790,196.

[51] Int. Cl.$^6$ .............................. H04N 7/12; H04N 11/04; H04N 11/02
[52] U.S. Cl. ......................... 348/404; 348/415; 348/419; 382/236; 382/251; 382/239
[58] Field of Search .............................. 348/27, 402, 403, 348/404, 405, 406, 409–415, 419, 420; 382/190, 232, 236, 238, 239, 242, 243, 248, 251; 341/200; 375/245; H04N 7/12, 11/02, 11/04

[56] References Cited

U.S. PATENT DOCUMENTS

| | | |
|---|---|---|
| 5,557,330 | 9/1996 | Astle ........................................ 348/394 |
| 5,565,921 | 10/1996 | Sasaki et al. ............................ 348/409 |
| 5,638,125 | 6/1997 | Jeong et al. ............................. 348/405 |
| 5,677,969 | 10/1997 | Auyeung et al. ....................... 382/239 |
| 5,686,963 | 11/1997 | Uz et al. .................................. 348/404 |
| 5,706,367 | 1/1998 | Kondo ..................................... 382/236 |
| 5,790,196 | 8/1998 | Sun et al. ................................ 348/419 |
| 5,838,830 | 11/1998 | Qian et al. .............................. 382/243 |
| 5,883,977 | 3/1999 | Kim ......................................... 348/242 |

_Primary Examiner_—Bryan Tung
_Assistant Examiner_—Tung Vo
_Attorney, Agent, or Firm_—Dirk Brinkman

[57] ABSTRACT

A method adaptively encodes a sequence of frames including video objects to provide a compressed video signal. The encoding is via a buffer having a variable input rate and a constant output rate. The encoding uses a discrete cosine transform to produce coefficients that are quantized to generate image-representative code bits at a variable rate and texture, and motion and shape information for each video object stored in the buffer. The content of the buffer is restricted by adjusting quantization parameters with respect to a reference value and a quadratic rate distortion model to increase or decrease the number of bits stored in the buffer. Furthermore, the target number of bits for encoding each video object is estimated in accordance with a function of relative motion and size. The encoding bit rate is set to avoid buffer overflow.

24 Claims, 11 Drawing Sheets

ADAPTIVE VIDEO CODING METHOD

RELATED APPLICATION

This application is a continuation-in-part of Application Serial No. 08/800,880, filed Feb. 14, 1997, now U.S. Pat. No. 5,790,196, in the names of Hui-Fang Sun and Anthony Vetro, entitled "Adaptive Video Coding Method", which application is assigned to the same assignee as the present application.

BACKGROUND OF THE INVENTION

1. Field of the Invention

This invention relates to methods of coding video signals for digital storage and/or transmission of such signals using joint rate control for multiple video objects based on a quadratic rate-distortion model.

More particularly, this invention relates to a method of encoding video employing a joint rate control algorithm for multiple video object coding. The algorithm is based on the VM7 rate control scheme as described in the MPEG-4 Video Verification Model V7.0 ISO/ICC JTCI/SC29/WG11, Coding of Moving Picture and Associated Audio MPEG 97/N1642. April 1997, Bristol, U.K.

The method follows a similar framework as that proposed previously by the current inventors in their parent application, with a change in the method of target distribution and introduction of a tool to take into account object shape in the rate control process. These modifications contribute to more homogeneous quality among video objects and better buffer regulation. As a whole, the method provides an effective means of coding multiple video objects so that the buffer is well-regulated and bits are appropriately distributed; yet it is flexible in deciding the necessary compromise between spatial and temporal quality.

2. Description of the Prior Art

A basic method for compressing the bandwidth of digital color video signals which has been adopted by the Motion Picture Experts Group (MPEG) utilizes Discrete Cosine Transform (DCT) techniques. In addition, the MPEG approach employs motion compensation techniques.

The MPEG standard achieves high data compression rates by developing information for a full frame of the image only every so often. The full image frames, or intra-coded pictures are called "I-frames", and contain the full frame information independent of any other frames. Between the I-frames, there are so-called B-frames and P-frames which store only image differences which occur relative to reference anchor frames.

More specifically, each frame of video sequence is partitioned into smaller blocks of pixel data and each block is subjected to the discrete cosine transformation function to convert the statistically dependent spatial domain picture elements (pixels) into independent frequency domain DCT coefficients.

That is, the blocks of data, encoded according to intraframe coding (I-frames), consist of matrices of Discrete Cosine Coefficients. Respective 8×8 or 16×16 blocks of pixels are subjected to a Discrete Cosine Transform (DCT) to provide a coded signal. The coefficients are subjected to adaptive quantization, and then are run-length and variable-length encoded. Hence, respective blocks of transmitted data may include fewer than an 8×8 matrix of codewords. Macroblocks of intraframe encoded data will include, in addition to the DCT coefficients, information such as the level of quantization employed, a macroblock address or location indicator, and a macroblock type, the latter information being referred to as "header" or "overhead" information.

Blocks of data encoded according to P or B interframe coding also consist of matrices of Discrete Cosine Coefficients. In this instance however, the coefficients represent residues or differences between a predicted 8×8 pixel matrix and the actual 8×8 pixel matrix. These coefficients are subjected to quantization and run- and variable-length coding. In the frame sequence, I and P frames are designated anchor frames. Each P frame is predicted from the lastmost occurring anchor frame. Each B frame is predicted from one or both of the anchor frames between which it is disposed. The predictive coding process involves generating displacement vectors which indicate which block of an anchor frame most closely matches the block of the predicted frame currently being coded. The pixel data of the matched block in the anchor frame is subtracted, on a pixel-by-pixel basis, from the block of the frame being encoded, to develop the residues. The transformed residues and the vectors comprise the coded data for the predictive frames. As with intraframe coded frames, the macroblocks include quantization, address and type information.

The results are usually energy concentrated so that a few of the coefficients in a block contain the main part of the picture information. The coefficients are quantized in a known manner to effectively limit the dynamic range of the coefficients and the results are then run-length and variable-length encoded for application to a transmission medium.

In a recent proposal for implementing the latest coding verification model (VM), which is described in "MPEG-4 Video Verification Model Version 5.0", distributed by Adhoc group on MPEG-4 video VM editing to its members under the designation ISO/IEC JTC1/SC29/WG11 MPEG 96/N1469, November 1996, the contents of which are incorporated herein by reference, representatives of the David Sarnoff Research Center proposed "A New Rate Control Scheme Using Quadratic Rate Distortion Model". The MPEG-4 video coding format will produce a variable bit rate stream at the encoder from frame to frame (as was the case with prior schemes). Since the variable bit rate stream is to be transmitted over a fixed rate channel, a channel buffer is employed to smooth out the bit stream. In order to prevent the buffer from overflowing or underflowing, rate control of the encoding process is required.

In the recent Sarnoff proposal, before the encoding process begins for a given set of frames (picture) a target bit rate for each frame is calculated to accommodate the fact that the output bit rate from the output of the encoder is constrained to a fixed bit rate while the bit rate resulting from picture encoding can vary over a relatively wide range (if left uncorrected), depending on the content of the image frame. According to the proposal, the distortion measure associated with each frame is assumed to be the average quantization scale of the frame and the rate distortion function is modeled as a second order function of the inverse of the distortion measure. Before the actual encoding process begins the target bit rate of the image is estimated by the number of bits left for coding the group of images, as well as the number of frames still to be encoded. The authors mention implementing their scheme at the picture level and also note a possibility for extending their scheme to the macroblock level.

It has also been known that when a block (macroblock) contains an edge boundary of an object, the energy in that block after transformation, as represented by the DCT coefficients, includes a relatively large DC coefficient (top left corner of matrix) and randomly distributed AC coefficients throughout the matrix. A non-edge block, on the other hand, usually is characterized by a similar large DC coefficient (top left corner) and a few (e.g. two) adjacent AC coefficients which are substantially larger than other coefficients associated with that block. This information relates to image changes in the spatial domain and, when combined with image difference information obtained from comparing successive frames (i.e. temporal differences) factors are available for distinguishing one video object (VO) from another.

As shown in FIG. 1 (a sample video scene), one or more video objects ($VO_1$, $VO_2$, $_{VOi}$) may be contained in an image frame or plane (VOP) and, in each successive frame, the relative positioning of video objects may be expected to change, denoting motion. At the same time, this motion assists in defining the objects.

Under the MPEG-4 VM, additional objectives of content-based manipulation and independent bit stream coding have been imposed to provide added functionality at the decoder end of the system. The MPEG-4 objective complicates and imposes additional processing requirements on the process of predicting target bit rates for each frame as a result of the added overhead information such as the coding of shape information within the MPEG-4 encoder. The foregoing characteristics of the MPEG-4 VM, as well as information regarding identification of individual VO's is explained in greater detail in the above-referenced manual.

It is an object of the present invention to provide an adaptive video coding method which is particularly suitable for MPEG-4 encoder and other encoding schemes.

It is a further object of the present invention to provide an adaptive video coding method for use in accordance with MPEG-4 VM wherein individual video objects (VO's) are taken into account in providing an improved bit rate control system making use of relative motion, size, variance and shape of each VO.

SUMMARY OF THE INVENTION

In accordance with the present invention, a method is described which achieves a constant bit rate output when coding multiple video objects. This implementation makes use of a quadratic rate-distortion model. Each object is described by its own set of parameters. With these parameters, an initial target bit estimate is made for each object after a first frame is encoded. Based on output buffer fullness, the total target is adjusted and then distributed proportional to a parameter set representative of the activity of the objects in the frame. Activity is determined by reference to weighted ratios derived from motion, size and variance parameters associated with each object. A shape rate control parameter is also invoked. Based on the new individual targets and second order model parameters, appropriate quantization parameters can be calculated for each video object. This method assures that the target bit rate is achieved for low latency video coding.

In order to provide a suitable bit rate control system based on a quadratic rate-distortion model, it has been found that control information may be applied jointly with respect to video objects (VO's), rather than entire frames.

DRAWING

Figure 4:
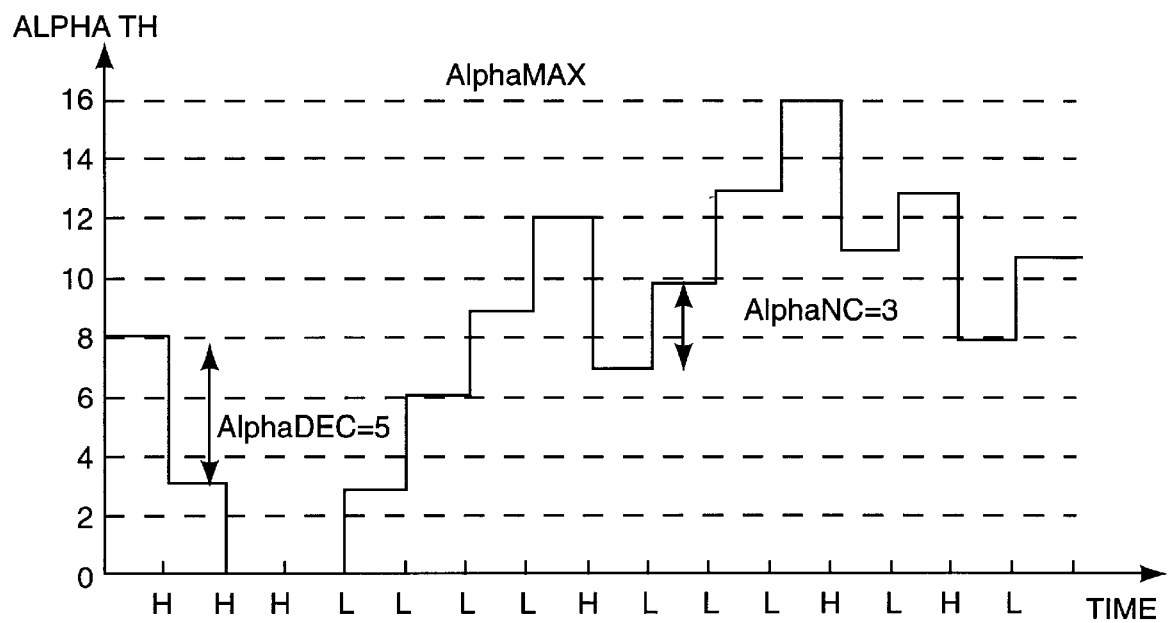

FIG. 4 is a diagram of the parameter "AlphaTH" as a function of time which illustrates a time sequence of shape rate control decisions based on mode of operation ("H" or "L") according to the present invention; and FIGS. 6–16 are a set of plots of buffer occupancy (bits) percentage versus frame for a series of video signal sequences representative of particular named images encoded with low and high bit rates in accordance with the present invention as identified in Table 2 and Table 4 below.

DETAILED DESCRIPTION

Figure 1:
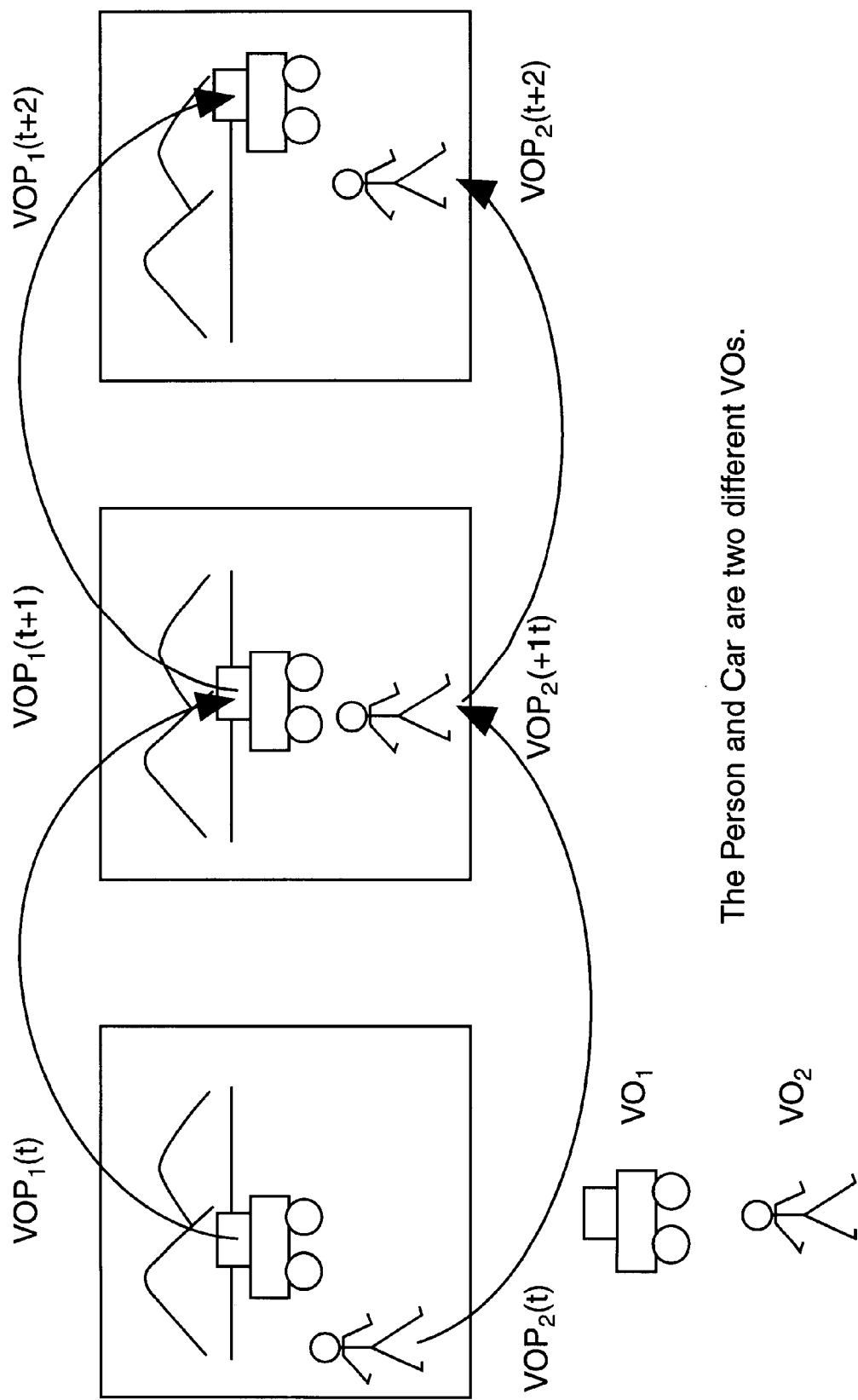
FIG. 1 is a schematic pictorial representation of three successive image frames having two video objects ($VO_1$ and $VO_2$) and a background image, where each of the VO's moves from left to right in the scene over time.
Figure 2:
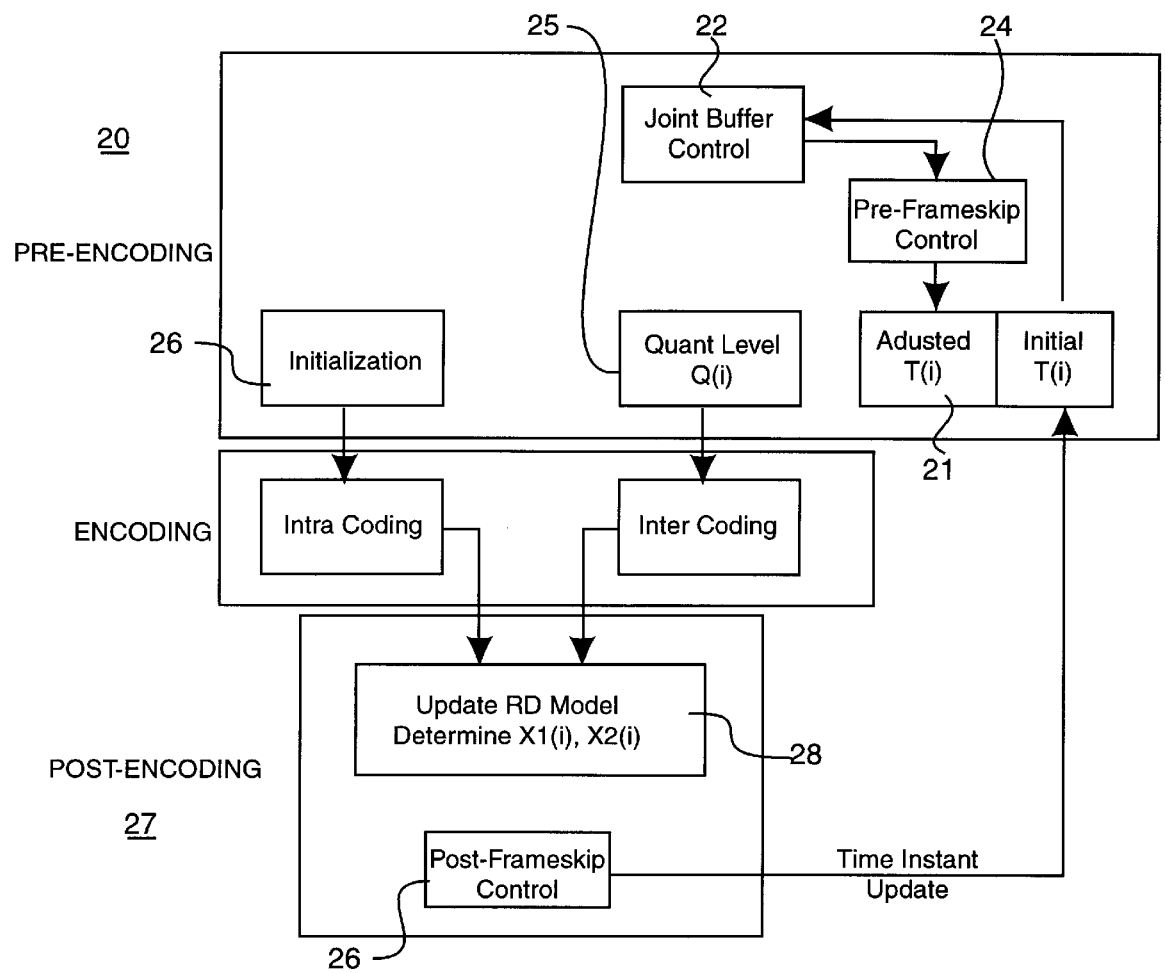
FIG. 2 is a block diagram illustrating steps in the method according to the invention of our parent application, along with the interrelationships among such steps.

As is set forth in our earlier-filed parent U.S. patent Application referred to above, a method for performing joint bit rate control can be broken down into a pre-encoding stage and a post-encoding stage. As shown in FIG. 2, a pre-encoding stage 20 comprises (i) target bit estimation 21, (ii) joint buffer control 22, (iii) a pre-frameskip control 24, and (iv) a quantization level calculation 25. The post-encoding stage 27 comprises (i) updating the rate-distortion model 28, and (ii) a post frameskip control 29. An important aspect of this scheme, not evident from the block structure, is that most blocks require previous operations to be complete for every video object (VO). For instance, inter-coding 31 of the next VO to be coded will not begin until all quantization levels for preceding VO's have been calculated. In this embodiment, all the VO's are coded at the same frame rate. However, many of the aspects of the current implementation anticipate a migration towards different frame rate for each VO. However, a more complex buffer control will be required.

Figure 5:
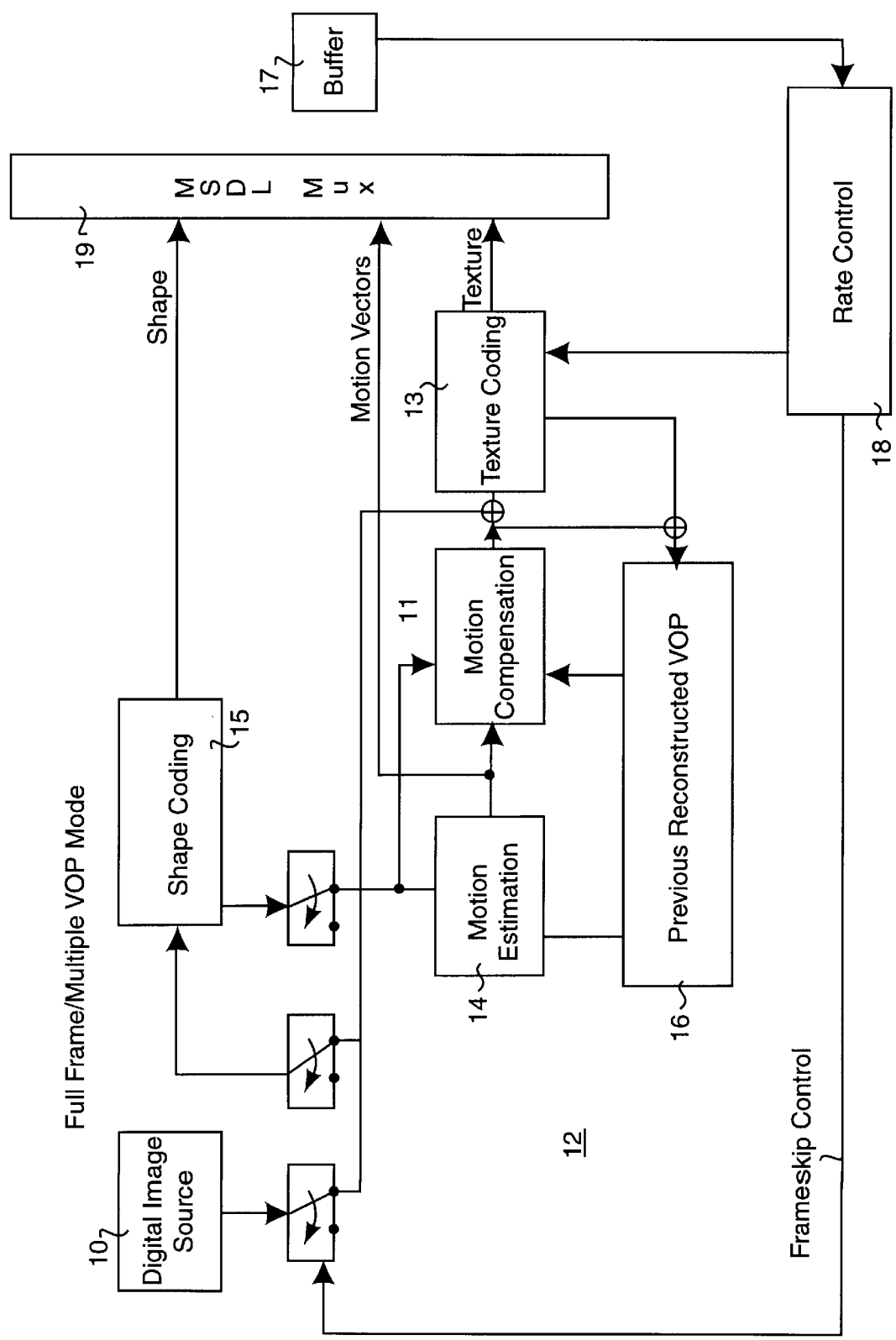
FIG. 5 is a block diagram of an MPEG-4 encoder which has been modified to implement the inventions of our parent application and/or the present invention.
Figure 6:
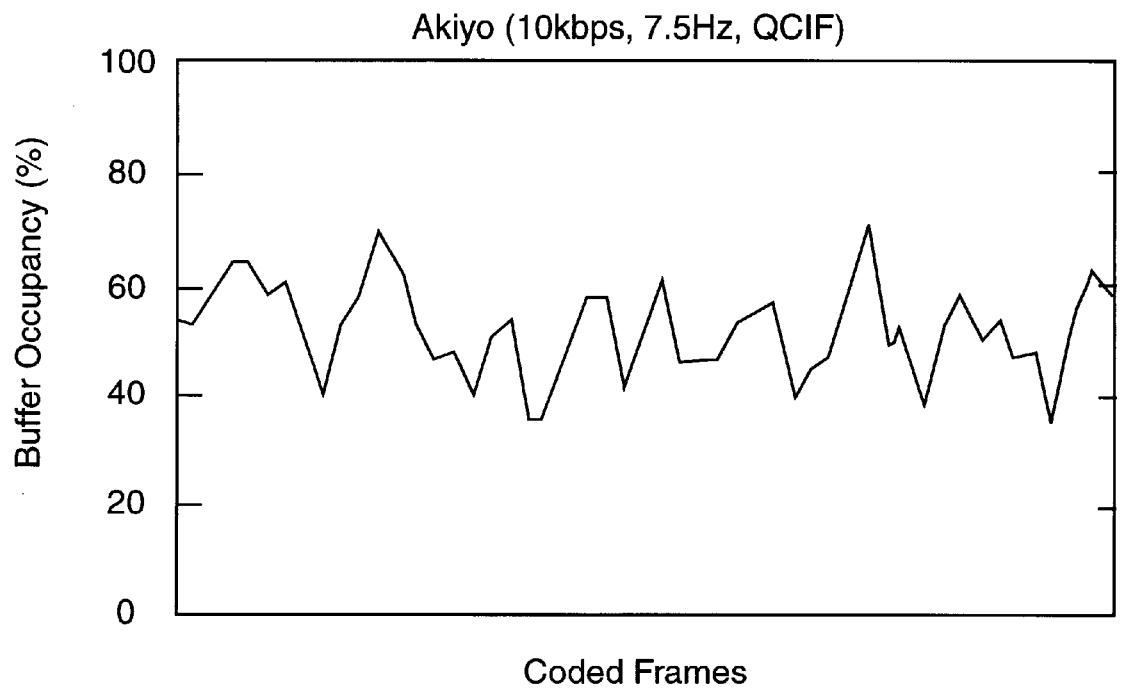
Figure 7:
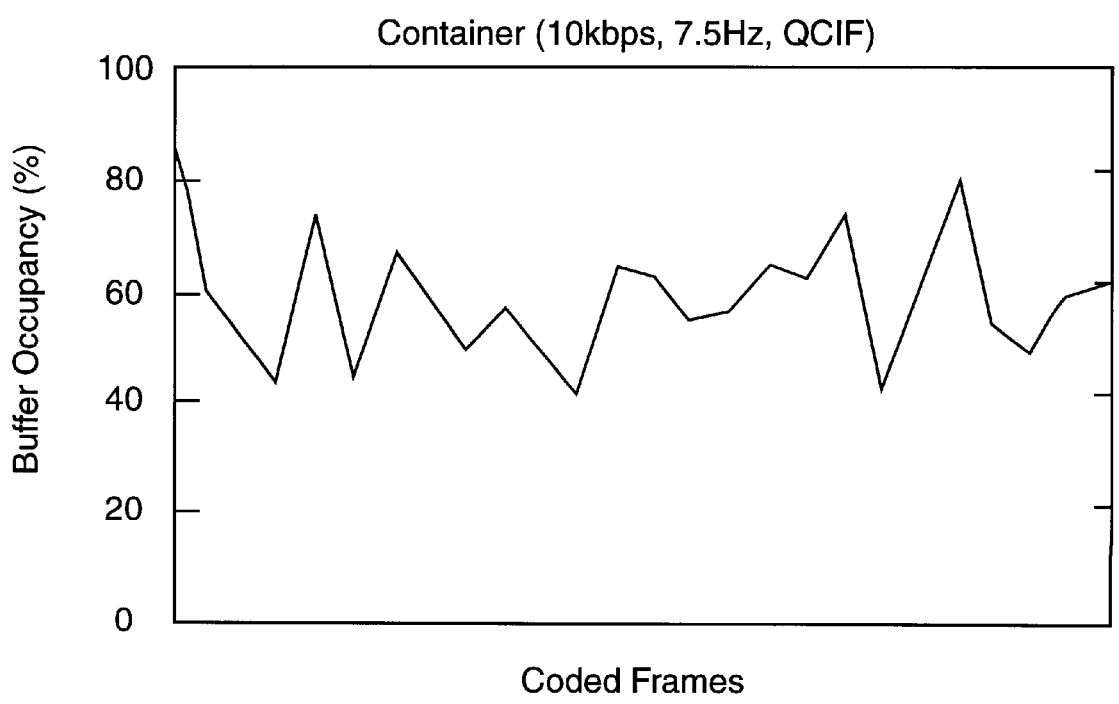
Figure 8:
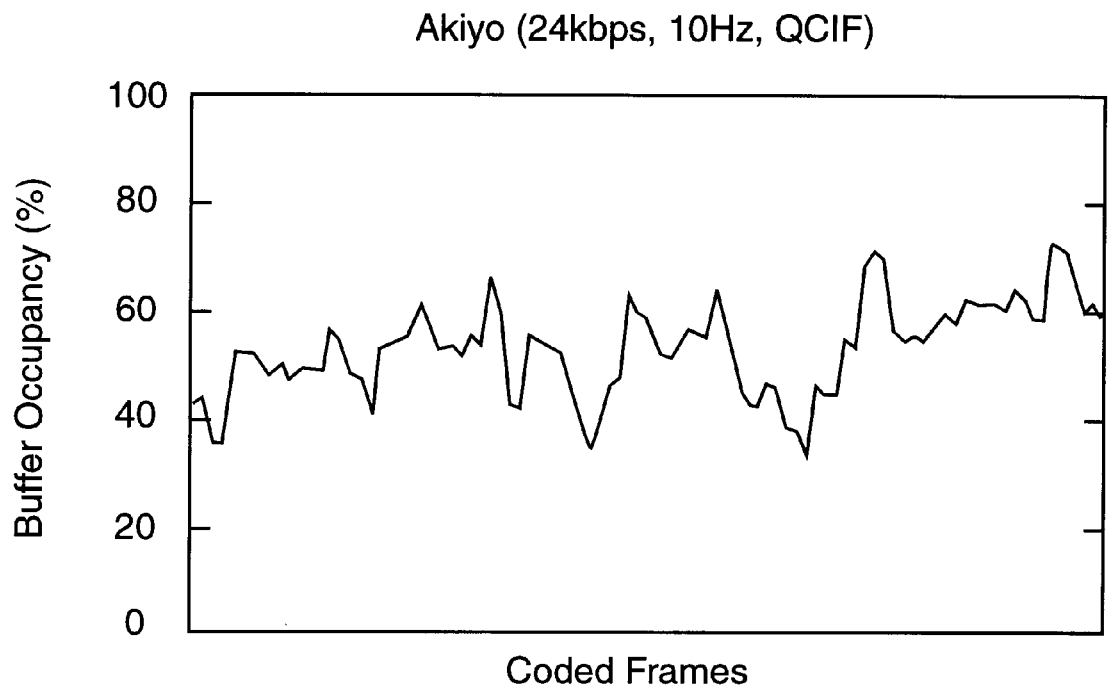
Figure 9:
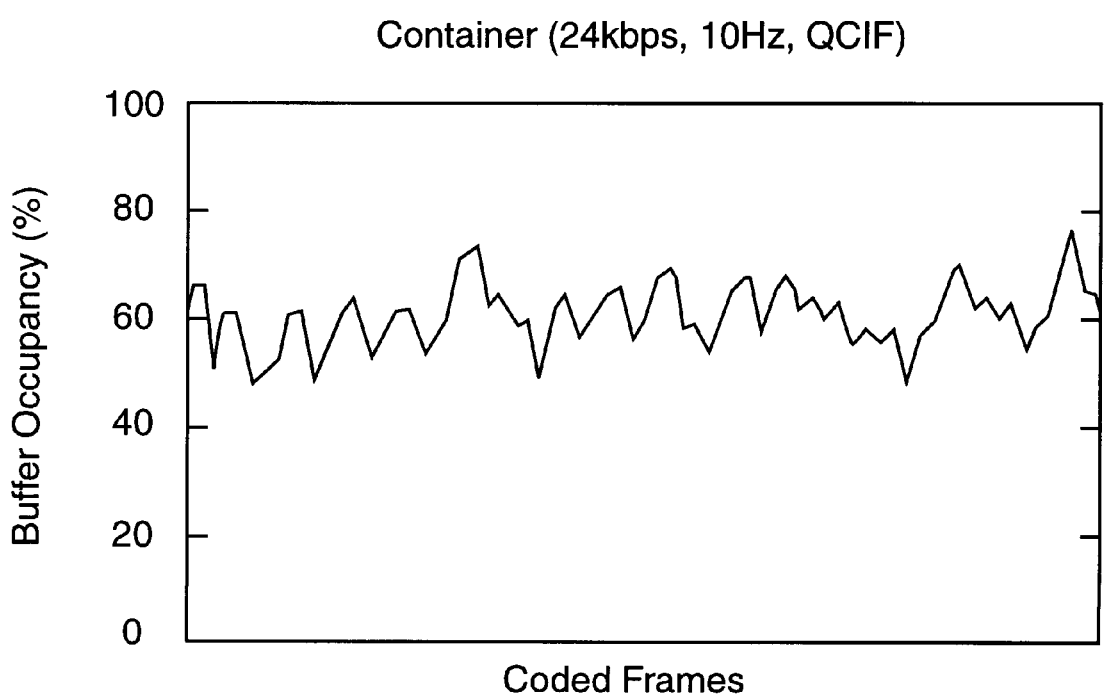
Figure 10:
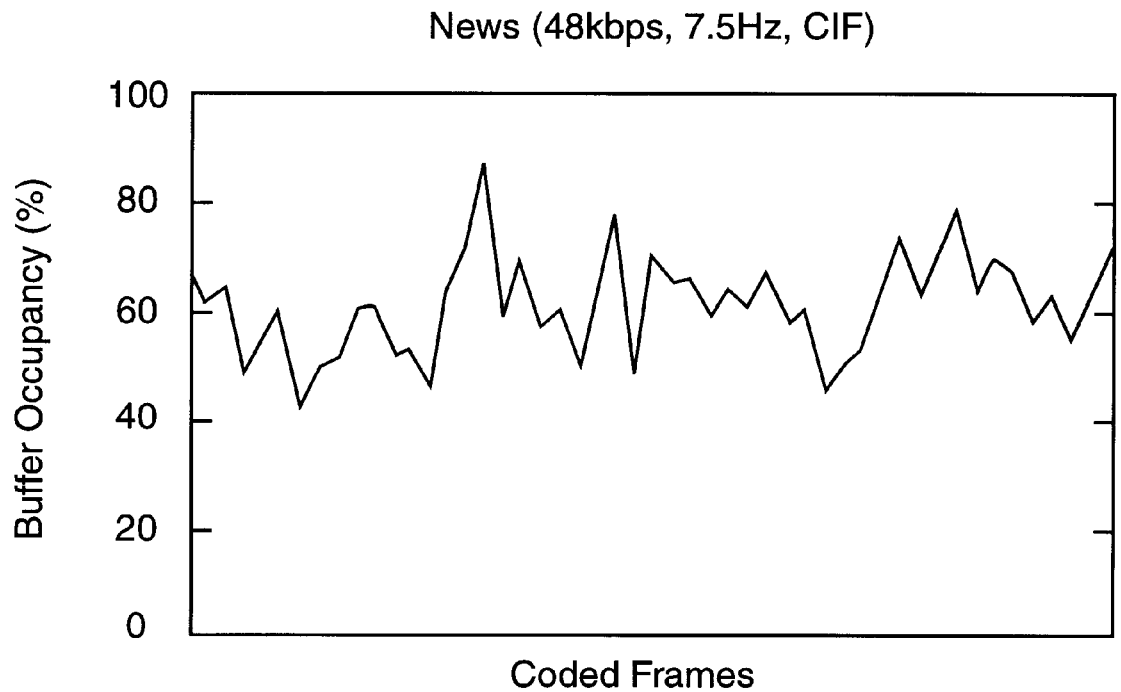
Figure 11:
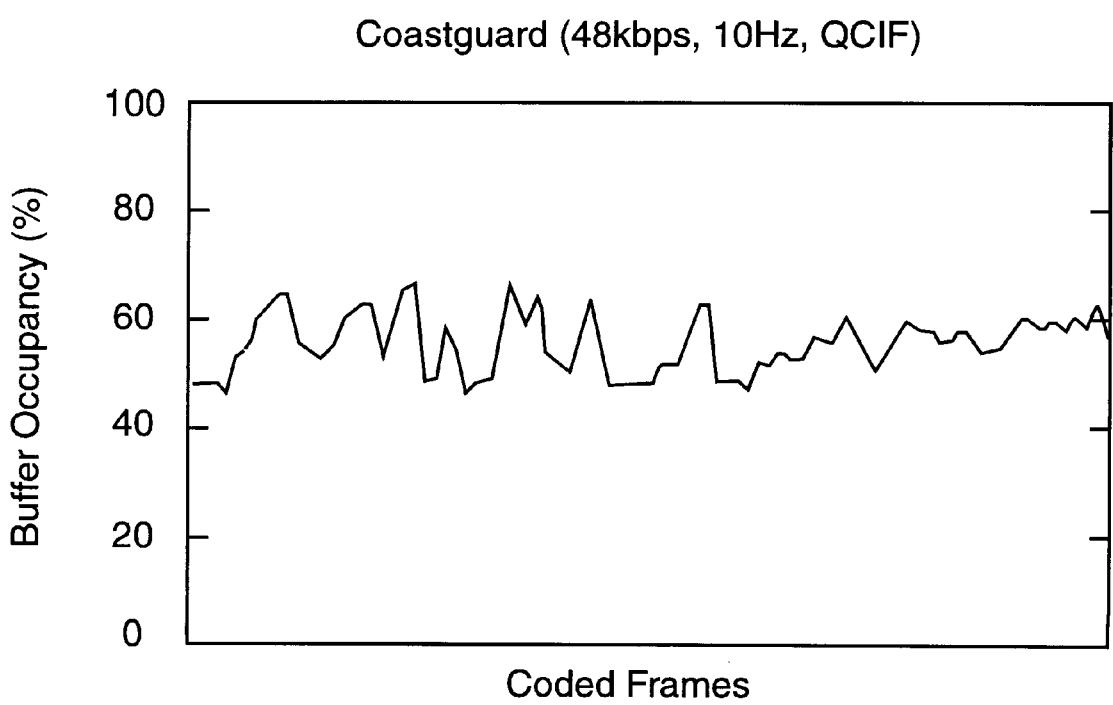
Figure 12:
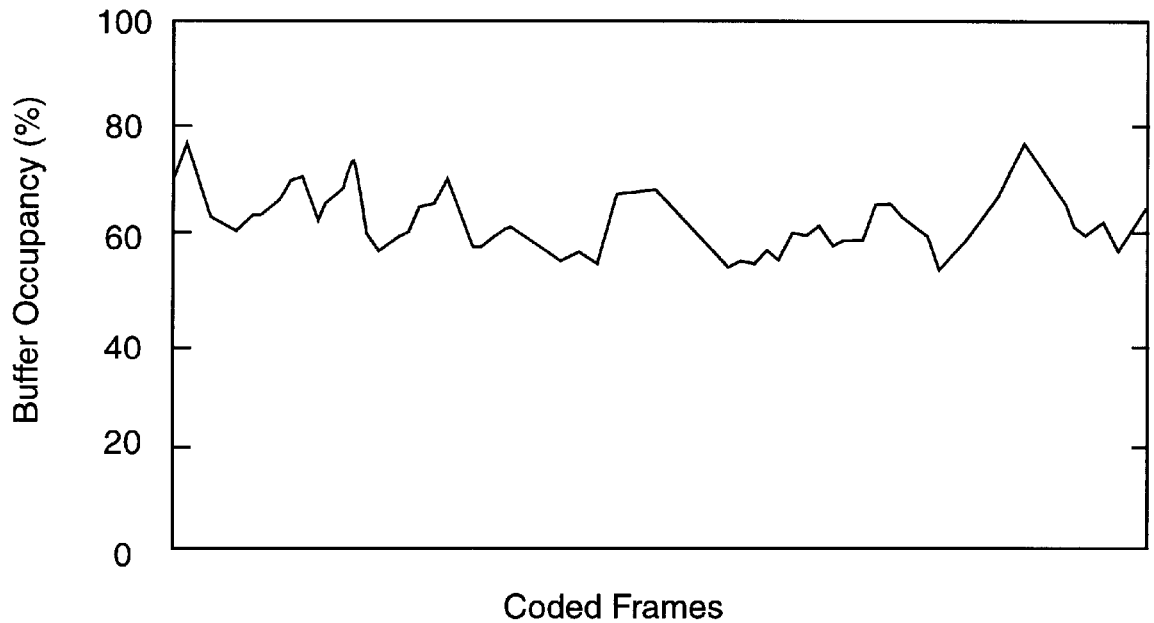
Figure 13:
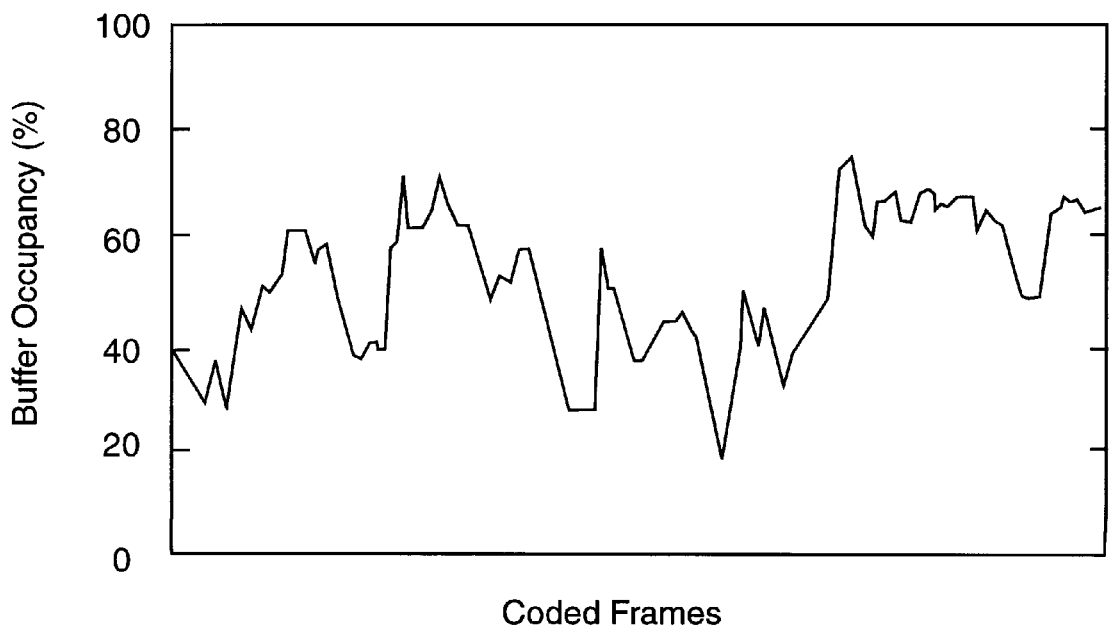
Figures 14, 15:
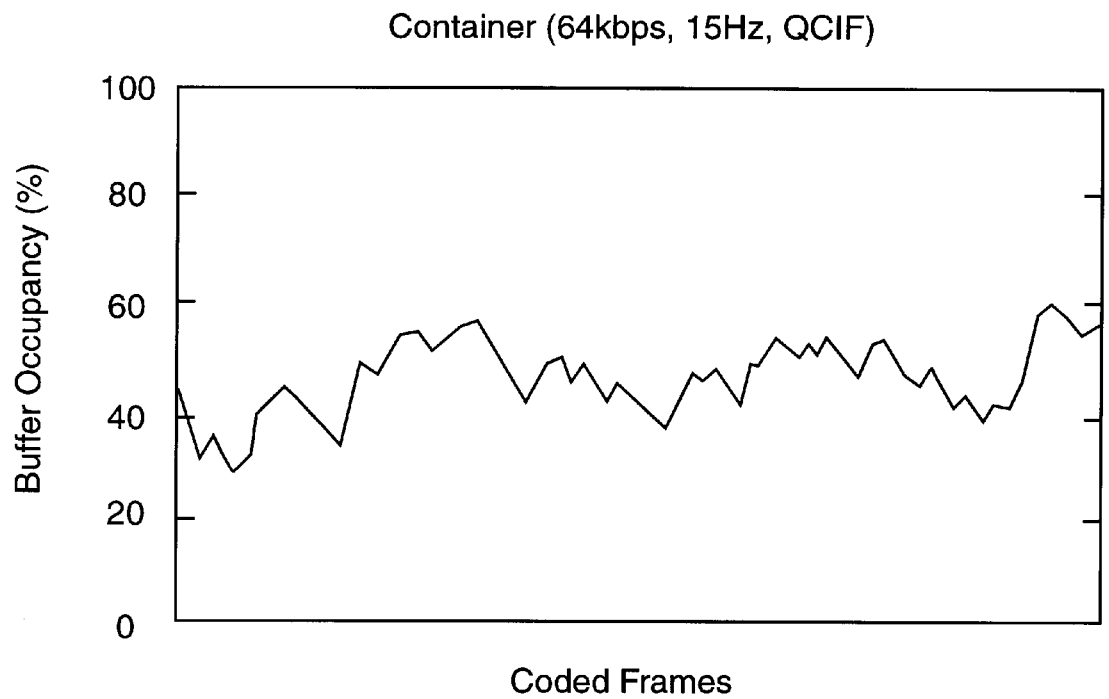
Figure 16:
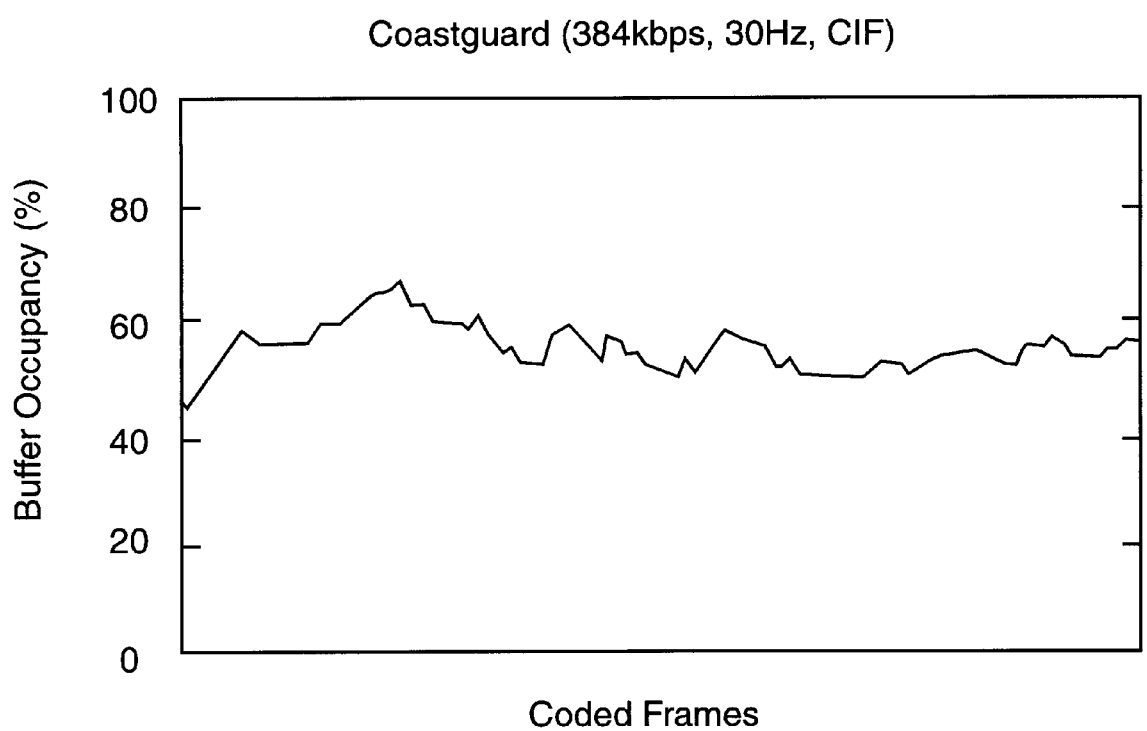

In a preferred embodiment of our parent application, an adaptive video encoder (FIG. 5) is arranged to follow the method illustrated in FIG. 2. A Digital Image Source 10 provides image information on a frame basis or on a Video Object (VO) basis to a video signal encoder 12 in digitized form. The image is partitioned into spatially non-overlapping blocks of pixel data. The block size of 8×8 pixels or 16×16 pixels may be employed. Each partitioned block is then processed.

A motion estimator 14 is used to estimate a motion vector for the input block with reference to a temporally close reference frame stored in a frame memory (previously reconstructed VOP 16). The reference frame may be an original unprocessed frame or a previously coded frame. Bi-directional motion estimation such as that described in the MPEG standards can also be applied.

A motion compensation block 11, a texture coding block 13, a shape coding block 15, a constant output bit rate buffer 17 and an MSDL multiplexer 19, all arranged as described in the MPEG-4 reference document, are provided. In addition, a rate control system 18 (as described in connection with FIG. 2) is provided to perform added functions according to the invention of our parent application.

Referring again to FIG. 2, the pre-encoding stage 20 further includes Initialization 26 (see Table I below).

A. Initialization 26

In this section, most rate control variables (e.g., first and second order complexities and MAD or Mean Absolute Difference information) have been extended to vectors so that each VO can carry its own separate information. Among those that have not been changed are the remaining number of bits for the segment and the rate of buffer drain. Table 1 summarizes the notations used to describe the method.

TABLE 1

Notation used for joint rate control based on quadratic rate-distortion model.

| VARIABLES | DESCRIPTION |
| --- | --- |
| Buff_drain | Number of bits to be removed from the buffer per picture |
| MAD[i] | Mean absolute difference for current VO after motion compensation |
| X1 [i], X2 [i] | First and second order complexity measures |
| Q [i] | Quantization parameter for ith VO |
| N_skip_post | Number of frames to skip according to post-frameskip |
| N_skip_pre | Number of frames to skip accoding to pre-frameskip |
| N_skip | Total number of frames to be skipped |
| N_btwn | Number of frames between encoded frames |
| B_left | Number of bits left for coding the sequence |
| T_texture [i] | Texture bit count for ith VO |
| T_texture | Total texture bit count (all VOs) |
| T [i] | Bit count for ith VO including texture, shape, motion and header bits |
| T | Total bit count including texture, shape, motion and header bits |
| H [i] | Header bit count including shape and motion |
| H | Total header bit count (all VOs) |
| Buff_size | Size of buffer |
| Buff_level | Current fullness of buffer |

B. Post-Encoding Stage 27

After the encoding stage 30, the parameters for the rate-distortion model must be sought. For multiple-VO, the encoder rates-distortion function is modeled as:

$$T_{texture} = \sum_{all\,VO} \left\{ \frac{X1_i \cdot MAD_i}{Q_i} + \frac{X2_i \cdot MAD_i}{Q_i^2} \right\}$$

From the above equation, the model parameters, $X1_i$ and $X2_i$, can be calculated separately for every VO. In the above equation, the target value, T_texture, is decomposed into multiple $T\_texture_i$, which corresponds to the amount of bits used for coding the texture component only of the ith VO.

Referring to FIG. 2, the next step in the post encoding stage 27 is the post-frame skip control function 29. At this point the buffer 17 has been updated. Overflow is prevented by checking the current buffer level against a skip margin, γ. If the current buffer level is above the designated margin, frames are continually skipped, i.e., N_skip_post is incremented, until a specific criteria is met.

In accordance with one embodiment of our parent application, this post-frame skip control is incremented until the criteria:

Buff_level−N_skip_post·Buff_drain<(1−γ)·Buff_size is met.

In a preferred arrangement for our parent application, γ is chosen to equal 0.2. After the condition of the equation above has been satisfied and N_skip_post has been found, the value of N_skip_pre is added to it. The determination of N_skip_pre will be discussed shortly. The final value, N_skip=N_skip_pre+N_skip_post, is equal to the total frames to be skipped. It is this value which determines the new time instant. Note that the time instant can only be updated after the post-frameskip control function occurs.

Proceeding with the next pre-encoding stage of the first arrangement, the initial target bit rate is calculated based on the number of available bits for the segment and the number of bits used in the previous corresponding VO. A similar lower bound to the frame-based simulation is used so that minimum quality is guaranteed.

$T[i]=\text{Max}\{B\_left/(30*\text{numVOs}), B\_left/(\text{numVOleft}[i]*\text{numVOs})\}$ $T[i]=T[i]*(1-\alpha)+B\_past[i]*\alpha$ The weighting a represents a contribution from the past frame and is set to 0.2 in that implementation.

Once the initial target has been set, adjustments based on the buffer 18 fullness are made according to, $T=T*(2a+b)/(b+2a)$, where a=Buff_level and b=buff_size−Buff_level. Note that this target rate represents the sum of all individual target rates. Further changes are made based on the expected effect of the target with respect to the current and future buffer 18 level. Denoting a safety margin by 6, we increase the target by, T_inc=Buff_drain−T−Buff_level+δ·Buff_size if Buff_level−Buff_drain+T<ω·Buff_size On the other hand, we decrease the target by, T_dec=Buff_level+T−(1−δ)·Buff_size if Buff_level+T>(1−δ)·Buff_size.

The operations described above are part of the joint buffer control. In the illustrated implementation, δ is set to 0.1.

The next step is to redistribute the bits so that consistent quality is maintained across different objects. To achieve this, the size of the object and the amount of activity which it is experiencing are obtained from the header information of the previously coded objects. However, before distributing the target, a check is made to determine if the amount of bits used for the header of the previous frame exceed this bit count. The difference, s=T−H, denotes an approximation to the number of bits available for coding the texture of every VO. If s<0, then there may not be enough bits to uniformly code each VO. In this case, all targets are made negative. As is explained later, this forces lower bound constraints on the quantization parameter, thereby limiting the amount of bits spent on the texture. Additionally, if s<0, the pre-frameskip control 24 is invoked. Since the time instant is only updated after the post-encoding stage 27, this frameskip control block serves as a correction towards the next time instant update. When invoked, a non-zero value of N_skip_pre will be determined. This value is determined according to:

while $(s < O)$
{increment N_skip-pre
$s = s + Buff\_drain$}

This combination of making the targets negative and skipping extra frames will allow the rate control algorithm to better estimate the next target while providing uniform object quality.

In the event that s>0, the total target, T, is distributed proportional to the header information of the previously coded frame as:

$$T_i = H_i \cdot \left(1 + \frac{s}{H}\right)$$

Having a target for each VO, the next task is to determine individual distortion measures which correspond to the desired rate. Treating the process separately for each VO and normalizing with respect to the MAD, leaves us to solve the classic quadratic: $ax^2+bx+c=0$, where, $a=X2_i$
$b=X1_i$
$c=T\_texture_i/MAD_i$ Keeping in mind that $T\_texture_i$ is a result of subtracting the header bits from the total bits, it is possible to obtain small targets when performing low-bit-rate coding. To overcome this difficulty, we lower bound the target according to:

$$T\_texture_i = \text{Max}\left\{\frac{Buff\_drain}{3 \cdot MAD_i \cdot numVOs}, T\_texture_i\right\}$$

In the event that the target was negative, the derived quantization parameter is lower bounded by LB_QUANT, otherwise the usual clipping between 1 and 31 is employed. The use of this parameter ensures that a relatively small amount of bits will go to coding the texture. The value of LB_QUANT should be chosen to be greater than 25. As an alternative, we may decrease the amount of bits spent on shape coding by reducing the resolution of the alpha-plane before coding.

EXPERIMENTAL RESULTS

The table below summarizes the testing groups for the algorithm described in the preceding section. An initial quantization parameter of 15 was chosen for the I-frame, but thereafter the quantization parameter was automatically determined.

TABLE 2

Testing groups for coding multiple video objects.

| ID | Sequences | Bit Rate (kbps) | Frame Rate (Hz) | Format |
|---|---|---|---|---|
| 1 | Akiyo, Container | 10 | 7.5 | QCIF |
| 2 | Akiyo, Container | 24 | 10 | QCIF |
| 3 | News | 48 | 7.5 | CIF |
| 4 | Coastguard | 48 | 10 | QCIF |
| 5 | Coastguard | 112 | 15 | CIF |

In the coding of multiple VOs, three parameters are coded: shape, motion and texture. The encoder software allows the user to code the parameters in a combined mode or a separate mode; the simulation results presented here employ separate parameter encoding. Table 3 provides details of the PSNR for each VO (Y-component only) and also reports the actual bit rate achieved.

TABLE 3

Simulation results of core experiment

| Sequence | Target Rate | Frame Rate | Format | Y-psnr VO0 | Y-psnr VO1 | Y-psnr VO2 | Y-psnr VO3 | Y-psnr VO4 | Y-psnr VO5 | Actual Rate |
|---|---|---|---|---|---|---|---|---|---|---|
| Akiyo | 10 | 7.5 | QCIF | 35.79 | 27.23 | N/A | N/A | N/A | N/A | 10.03 |
| Container | 10 | 7.5 | QCIF | 31.96 | 23.76 | 19.98 | 25.56 | 29.60 | 18.87 | 9.90 |
| Akiyo | 24 | 10 | QCIF | 40.42 | 29.82 | N/A | N/A | N/A | N/A | 23.90 |
| Container | 24 | 10 | QCIF | 31.54 | 22.73 | 19.75 | 25.37 | 29.08 | 18.62 | 23.78 |
| News | 48 | 7.5 | CIF | 35.87 | 28.50 | 27.83 | 24.68 | N/A | N/A | 47.08 |
| Coastguard | 48 | 10 | QCIF | 29.09 | 23.15 | 25.96 | 26.40 | N/A | N/A | 47.82 |
| Coastguard | 112 | 15 | CIF | 27.13 | 22.74 | 24.24 | 26.64 | N/A | N/A | 111.94 |

From these results it is evident that the parent scheme is capable of achieving the target bit rate with satisfactory image quality. However, for low-latency applications we must also prevent the buffer from overflowing. For coding multiple video objects, there is a great deal of overhead information that must be specified. Often, this will leave the encoder with very few bits for coding the texture in each object. As a result, the encoder is forced to skip frames and/or increase the quantization level to maintain a suitable buffer level. Plots illustrating the buffer occupancy are provided in FIGS. 3–9 of our parent application. Additionally, the number of coded frames are specified. For each sequence, 300 frames (10 sec) were coded.

In our parent application we presented a means of encoding multiple video objects in a scene based on a quadratic rate-distortion model. The scheme is an enhancement of methods already proven for frame-based encoding simulations. A frame skip control is invoked to assist the buffer from becoming too full. Instances in which the buffer does overflow are indications of an unusually large amount of bits being spent on overhead. To prevent this, reductions can be made in the amount of overhead information (e.g., bits spent on shape).

PREFERRED EMBODIMENT

Figure 3:
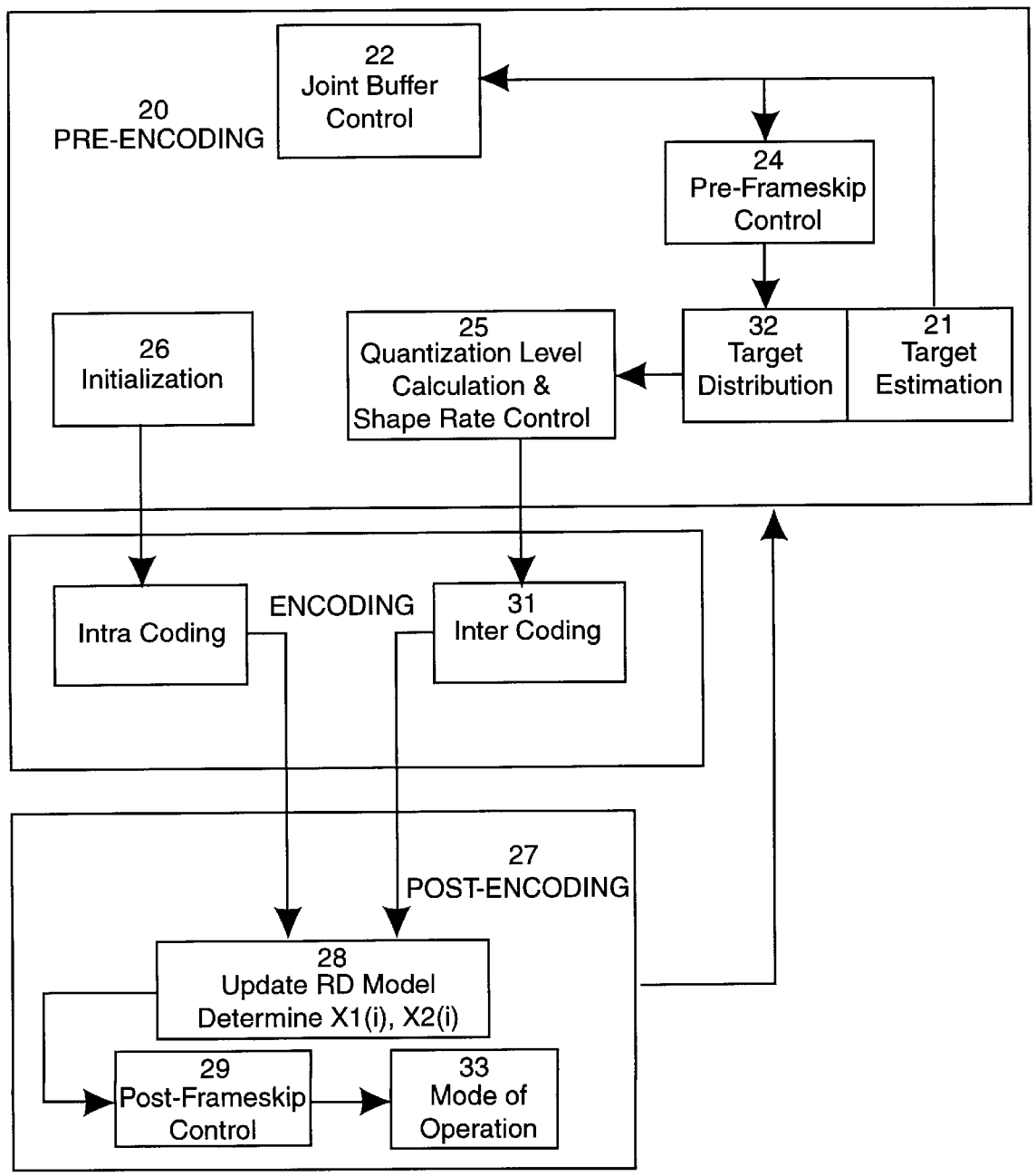
FIG. 3 is a block diagram illustrating steps in the method according to the present invention, along with the interrelationships among such steps.

In accordance with the present invention, the fundamental approach set forth in our parent application, along with modifications regarding the target distribution 32, mode of operation 33, shape-related rate control 25' and post-frameskip 29' as shown in FIG. 3 are employed. Two modes of operation are employed. The target distribution is based on the size, motion and variance (or MAD) of each object. The weights for each contribution depend on a mode of operation. A first mode is directed to low bit-rates (LowMode) and a second mode is directed to high bit-rates (HighMode). The new target distribution produces significant improvements in subjective quality. Modifications to the frameskip control prevent overflow of the register.

The method for performing joint rate control, as was the case in our parent application, can be broken into a pre-encoding stage and a post-encoding stage. As set forth above, the pre-encoding stage 20 comprises: (i) target bit estimation 21, (ii) joint buffer control 22, (iii) a pre-frameskip control 24, and (iv) a quantization level calculation 25'. The target bit estimation 21 is also associated with a modified target distribution function 32 as will be explained below. The quantization level calculation 25' is also associated with a shape rate-control function as will be explained. The post-encoding stage 27 comprises: (i) updating the rate-distortion model 28; (ii) a post-frameskip control 29' and a mode of operation function 33. FIG. 3 illustrates the present rate control process and includes additional features associated with the present invention which include the added target distribution 32, mode of operation 33, shape related rate control 25' and modified post-frameskip control 29'.

In the arrangement in our parent application, a target was sought for every object in the scene and all video objects were coded at the same frame rate. The total bits for one frame were distributed proportional to the amount of header bits in the previous corresponding object. In the present case, the bits are distributed proportional to a function which takes into account the relative motion, size and variance or "MAD" of each object. The MAD (Mean Absolute Difference) associated with each particular video object in each VOP (which is motion compensated) has been determined to be a suitable measure of variance for purposes of rate control. In a preferred arrangement, the MAD[i] factor is selected to be $MAD^2[i]$. For a total target, T, the amount of bits for every VO can be expressed as:

$$T[i] = w_m * MOT[i] + w_s * SIZE[i] + w_v * MAD^2[i],$$

where MOT[i], SIZE [i] and MAD[i] denote the relative ratios of the motion, size, and mean absolute difference parameters, respectively, and $w_m$, $w_s$ and $w_v$ are weights which satisfy the equation:

$$w_m + w_s + w_v = 1.$$

MODES OF OPERATION

The post encoding function 27 includes mode of operation function 33. Specifically, two different modes of operation: one for encoding at low-bit rates and another for encoding at high bit-rates are provided.

When encoding at high bit rates, the availability of bits allows the process to be flexible in its target assignment to each VO. Under these circumstances, it is reasonable to impose homogeneous quality to each VO. Therefore, the inclusion of the MAD parameter is important to the target distribution and should carry the highest weighting. On the other hand, when the availability of bits is limited, it is very difficult to achieve homogeneous quality among the various VO's. Also, under low bit-rate constraints, it is desirable to spend less bits on the background and more bits on the foreground. In that case, the significance of the MAD parameter is decreased and the significance of the motion parameter is increased. Based on the above arguments and experimental trial-and-error, the preferred weights are: $w_m=0.6$, $w_s=0.4$, $w_v=0.0$ for LowMode and $w_m=0.25$, $w_s=0.25$, $w_v=0.5$ for HighMode.

Besides regulating the quality within each frame, it is also important to regulate the temporal quality as well, i.e., keep the frame skipping to a minimum. In HighMode, this is very easy to do since the availability of bits is plentiful. However, in LowMode, frame skipping occurs much more often. In fact, the number of frames being skipped is a good indication of in which mode the process should be operating. This is expressed as follows:

if(total_frames_skipped>SKIP_TH)
        Operate in LowMode
    else
        Operate in HighMode In the current implementation, the skip threshold (SKIP_TH) was set to 2.

The decision process to obtain a mode of operation can also be seen as a constraint on the temporal resolution. If the system is in LowMode, the encoder has skipped some specified number of frames. To obtain a reasonable compromise between the spatial and temporal quality, LowMode will impose a lower bound on the calculated quantization parameter. This lower bound, LB_QUANT, preferably is the same as that used in our previous application when the target from the joint buffer control was less than the amount of header bits used in the last frame.

The modified function of the post-frameskip control 29' is to determine the current buffer 17 occupancy and ensure that encoding of future video objects will not cause the buffer 17 to overflow. In the previous implementation, this evaluation was based only on the current buffer 17 level. A positive value of N_skip_post was determined to satisfy the following condition:

$$\text{Buff\_level} - \text{N\_skip\_post} \cdot \text{Buff\_drain} < (1-\gamma) \cdot \text{Buff\_size}$$

In the current embodiment, information from the previous frame is utilized to obtain a better expectation of the amount of bits which may be required to be transmitted. The new condition is as follows:

$$\text{Buff\_level} + \text{B\_last} - (\text{N\_skip\_post}+1) \cdot \text{Buff\_drain} < (1-\gamma) \cdot \text{Buff\_size},$$

where B_last denotes the total number of bits spent encoding the previous frame or set of video objects. In this way, buffer 17 will readily accept the same amount of bits which were spent in the previous time coding instant. Any excess bits should be absorbed into the safety margin, subsequently preventing overflow from occurring. As before, the gamma parameter, or skip margin is chosen to be 0.2.

SHAPE RELATED RATE CONTROL

The binary shape information (or binary alpha plane) which defines a particular object is simply a mask which sets a pixel value up to "2551" if it is part of the object or sets a pixel value to "0" if it is outside the object. According to version 7.0 of the MPEG-4 video verification model, rate control and rate reduction of the shape information can be achieved through size conversion of the alpha plane. The possible conversion ratios (CR) are 1, ½, or ¼. In other words, a 16×16 macroblock (MB) may be down-converted to an 8×8 or a 4×4 block. Each macroblock containing relative shape information for the object can be down-converted for coding, then reconstructed at the original size. A conversion error is calculated for every 4×4 pixel block (PB). The conversion error is defined as the sum of absolute differences between the value of a pixel in the original PB and the reconstructed PB. If the conversion error is larger than sixteen times "Alpha Threshold" (i.e., 16×AlphaTH), then this PB is referred to as an "Error PB". If there is one "Error PB" in a macroblock, then the conversion ratio (CR) for the macroblock is increased, with the maximum value being 1.

From the above discussion of shape coding, it is evident that the value of AlphaTH has considerable effect on the number of bits which will be spent on shape information for each VO. A method is described according to the present invention, for controlling the shape information based on the selection of the value of AlphaTH and the two modes of operation, LowMode and HighMode.

Assume that AlphaTH initially is set to a value AlphaINI. During an I-frame and the first P-frame, this initial value will be used to code the shape for every object in those frames. After the encoding stage, the rate control algorithm will determine the mode of operation. If the mode of operation is determined to be LowMode, then the system will increment the current AlphaTH by AlphaINC. If the mode of operation is determined to be HighMode, then the system will decrement the current AlphaTH by AlphaDEC. The maximum and minimum values of AlphaTH are AlphaMAX and 0, respectively. This shape rate control algorithm is summarized in FIG. 4. The horizontal axis denotes time. Along this axis are markings which identify a mode of operation (H=HighMode, L=LowMode). The vertical axis indicates a corresponding AlphaTH at each coding instant. In the example, AlphaMAX is set to 16, and the initial value AlphaINI=8 (one-half MAX). Also, AlphaDEC=5 and AlphaINC=3 in the example. In the most general case, AlphaINC and AlphaDEC need not be constants, but rather functions of the current AlphaTH (e.g., larger steps when closer to zero and smaller steps when closer to AlphaMAX). In a preferred arrangement, AlphaMAX=12, AlphaINC= AlphaDEC=4 and AlphaINI=0.

Note that FIG. 4 emphasizes the actions taken at each coding instant, where each coding instant is uniformly spaced. In an actual simulation, LowMode is only in operation after the total skipped frames in the previous post-encoding stage is greater than a selected value of a SKIP_ TH, thereby making the time coding instants non-uniform.

This adaptive selection of AlphaTH based on the mode of operation is quite effective in reducing the number of bits required for shape while maintaining sufficient quality at very low bit rates. At high bit rates, or simulations in which LowMode is less frequent, the shape information can be coded using a low AlphaTH, resulting in very high quality object boundaries, as expected. This method provides additional functionality to the mode of operation and complements its efforts in regulating the temporal and spatial coding resolutions by freeing up additional texture bits and/or maintaining suitable buffer occupancy.

EXPERIMENTAL RESULTS

In Table 2 above, the testing conditions for low bit-rate simulations are given; in Table 4, the testing conditions for high bit-rate simulations are given. In each, an initial quantization parameter of 15 was chosen for the I-frame, but thereafter the quantization parameter was automatically determined.

TABLE 4

High bit-rate testing groups for coding multiple video objects.

| ID | Sequences | Bit Rate (kbps) | Frame Rate (Hz) | Format |
|---|---|---|---|---|
| 6 | Akiyo, Container | 48 | 10 | QCIF |
| 7 | News | 192 | 15 | CIF |
| 8 | Coastguard | 384 | 30 | CIF |

In Table 5, the average PSNR (peak signal to noise ratio) values for each VO are given under the low-bit rate conditions. The number of coded frames, the average quantization scale within each video object and the actual bit rate achieved are also provided. The same information is provided in Table 6 for the high bit rate simulations. In FIGS. 6–16, plots of the buffer occupancy for each test sequence illustrate the exceptional control exhibited by the method under the low bit-rate and high bit-rate conditions.

TABLE 5

Simulation results of testing groups under low bit-rate conditions.

| Sequence-ID | Video Object | Average Quant Scale | PSNR (coded VO) | Coded Frames | PSNR (all frames) | Actual Bit Rate |
|---|---|---|---|---|---|---|
| Akiyo-1 | VO0 | 29.6 | 34.20 | 54/75 | 30.26 | 9.86 |
| Container-1 | VO0 | 30.4 | 31.13 | 29/75 | 26.15 | |
| | VO1 | 30.0 | 23.24 | | | |
| | VO2 | 27.5 | 19.91 | | | |
| | VO3 | 27.5 | 24.13 | | | |
| | VO4 | 29.6 | 28.60 | | | |
| | VO5 | 27.5 | 18.48 | | | |
| Akiyo-2 | VO0 | 20.3 | 36.71 | 100/100 | 33.48 | 23.87 |
| | VO1 | 9.7 | 31.73 | | | |
| Container-2 | VO0 | 29.7 | 31.21 | 77/100 | 27.21 | 23.92 |
| | VO1 | 28.7 | 23.08 | | | |
| | VO2 | 10.7 | 25.54 | | | |
| | VO3 | 12.9 | 26.63 | | | |
| | VO4 | 29.6 | 28.65 | | | |
| | VO5 | 6.8 | 27.96 | | | |
| News-3 | VO0 | 29.3 | 34.66 | 52/75 | 26.15 | 47.68 |
| | VO1 | 28.8 | 28.38 | | | |
| | VO2 | 29.3 | 27.44 | | | |
| | VO3 | 6.3 | 29.59 | | | |
| Coastguard-4 | VO0 | 26.4 | 28.75 | 93/100 | 25.11 | 47.69 |
| | VO1 | 17.5 | 25.10 | | | |
| | VO2 | 12.4 | 27.52 | | | |
| | VO3 | 22.2 | 26.70 | | | |
| Coastguard-5 | VO0 | 30.6 | 27.14 | 76/150 | 23.05 | 111.27 |
| | VO1 | 29.9 | 22.99 | | | |
| | VO2 | 28.4 | 24.77 | | | |
| | VO3 | 30.5 | 26.53 | | | |

TABLE 6

Simulation results of testing groups under high bit-rate conditions.

| Sequence-ID | Video Object | Average Quant Scale | PSNR (coded VO) | Coded Frames | PSNR (all frames) | Actual Bit Rate |
|---|---|---|---|---|---|---|
| Akiyo-6 | VO0 | 4.2 | 42.68 | 147/150 | 37.90 | 63.48 |
|  | VO1 | 4.9 | 36.27 |  |  |  |
| Container-6 | VO0 | 25.8 | 32.18 | 150/150 | 29.52 | 63.26 |
|  | VO1 | 15.7 | 26.05 |  |  |  |
|  | VO2 | 4.2 | 32.04 |  |  |  |
|  | VO3 | 4.3 | 35.06 |  |  |  |
|  | VO4 | 26.9 | 30.03 |  |  |  |
|  | VO5 | 2.11 | 39.23 |  |  |  |
| News-7 | VO0 | 3.7 | 43.43 | 148/150 | 33.50 | 254.23 |
|  | VO1 | 7.1 | 36.06 |  |  |  |
|  | VO2 | 8.5 | 33.54 |  |  |  |
|  | VO3 | 4.7 | 45.66 |  |  |  |
| Coastguard-8 | VO0 | 23.5 | 28.36 | 299/300 | 28.23 | 383.78 |
|  | VO1 | 15.6 | 27.09 |  |  |  |
|  | VO2 | 11.2 | 29.40 |  |  |  |
|  | VO3 | 18.1 | 29.08 |  |  |  |

In accordance with the foregoing invention, improvements on target distribution were made. Also, a shape rate control mechanism has been implemented. Simulations of each testing group show improvements over the previous implementation. The highlights of the proposed joint rate control scheme are: good subjective quality, excellent buffer regulation, homogenous quality among VO's, joint control of shape and texture coding and flexible framework to compromise spatial and temporal quality.

The modifications to the target distribution serve to better model the variance within an object. Since the variance has traditionally been used to indicate the amount of bits needed for coding, the distortion among objects will be more consistent.

The adaptive selection of AlphaTH based on the mode of operation is quite effective in reducing the number of bits for shape while maintaining sufficient quality at very low bit rates. At high bit rates, or simulations in which LowMode is less frequent, the shape information can be coded using a low AlphaTH, resulting in very high quality object boundaries. This method provides additional functionality to the mode of operation and complements its efforts in regulating the temporal and spatial coding resolutions by freeing up additional texture bits and/or maintaining suitable buffer occupancy.

Overall, the method is able to accommodate the functionality of the MPEG-4 standard in terms of coding multiple video objects for low-latency and low-bit-rate applications. It has also been shown to be scaleable to higher bit rate applications.

While the invention has been described in terms of a preferred embodiment, various modifications may be made in details of this implementation without departing from the scope of this invention, which is set forth in the following claims.

What is claimed is:

1. A method of adaptively encoding a sequence of frames of image information, wherein at least some of said frames contain a plurality of video objects, for providing a compressed video signal to a transmission channel by means of a buffer having a variable input bit rate and a substantially constant output bit rate comprising the steps of:

encoding each of said video objects in each of a set of frames using coding means including a processor for performing discrete cosine transform to produce transform coefficients and a quantizer for quantizing the transform coefficients to generate image-representative code bits at a variable rate, said encoding step producing texture, motion and shape information for each said video object;

storing said image representative code bits in said buffer;

restricting the contents of said buffer with respect to a predetermined limit value by adjusting quantization parameters utilized by said quantizer with respect to a reference value according to a quadratic rate distortion model to increase or decrease the amount of code bits generated by said coding means for said video objects in successive ones of said frames;

estimating a target number of bits for encoding each video object in each successive frame in a sequence occurring over a predetermined time interval following the first frame by distributing a target number of bits for all objects in each video object plane among said objects in accordance with a function of relative motion, size and variance parameters associated with corresponding objects in the corresponding object plane; and setting said variable rate for encoding at one of at least a higher rate and a lower rate to avoid overflow of said buffer while preserving image quality.

2. The method of claim 1 wherein said function further comprises a separate weighting factor for each of said motion, size and variance parameters.

3. The method of claim 1 wherein said variance parameter is derived from calculation of a mean absolute difference value for each pixel of a video object in a given object plane as compared to the corresponding pixel in a preceding object plane.

4. The method of claim 1 wherein said method further comprises the step of skipping the coding of a frame for a frame period whenever the difference between buffer bit capacity and current buffer level is less than a predetermined margin at the end of the encoding of all video objects in a frame.

5. The method of claim 3 wherein said function of relative motion, size and variance parameters includes a variable proportional to the square of said mean absolute difference value.

6. The method of claim 3 wherein said function is:

$$T[i]=W_m*MOT[i]+W_s*SIZE[i]+W_v*MAD^2[i]$$

where MOT[i], SIZE[i] and MAD[i] denote the relative ratios of motion, size and mean absolute difference parameters and $W_m$, $W_s$ and $W_v$ are weights which satisfy the expression $$W_m+W_s+W_v=1.$$

7. The method of claim 6 wherein $W_v$ is selected at a lower value and a higher value when said encoding rate is said lower rate and said higher rate, respectively.

8. The method of claim 7 wherein said weights are selected as $$W_m=0.6, W_s=0.4 \text{ and } W_v=0$$

for said lower encoding rate and $W_m$=0.25, $W_s$=0.25 and $W_v$=0.5 for said higher encoding rate.

9. The method of claim 7 wherein said weight $W_v$=0 for said lower encoding rate and $W_v$ is greater than $W_m$ or $W_s$ for said higher encoding rate.

10. The method of claim 1 wherein said setting of said variable rate is determined by counting a number of consecutive skipped frames in a time interval immediately preceding said setting step.

11. The method of claim 10 wherein said variable rate is set at said higher rate when said number of skipped frames is less than a predetermined number.

12. The method of claim 11 wherein said predetermined number is two.

13. The method of claim 4 wherein said variable rate is set at said higher rate when the number of said skipped frames is less than a predetermined number.

14. A method of adaptively encoding a sequence of frames of image information, wherein at least some of said frames contain a plurality of video objects, for providing a compressed video signal to a transmission channel by means of a buffer having a variable input bit rate and a substantially constant output bit rate comprising the steps of:

encoding each of said video objects in each of a set of frames using coding means including a processor for performing discrete cosine transform to produce transform coefficients and a quantizer for quantizing the transform coefficients to generate image-representative code bits at a variable rate, said encoding step producing texture, motion and shape information for each said video object;

storing said image representative code bits in said buffer;

restricting the contents of said buffer with respect to a predetermined limit value by adjusting quantization parameters utilized by said quantizer with respect to a reference value according to a quadratic rate distortion model to increase or decrease the amount of code bits generated by said coding means for said video objects in successive ones of said frames;

estimating a target number of bits for encoding each video object in each successive frame in a sequence occurring over a predetermined time interval following the first frame by distributing a target number of bits for all objects in each video object plane among said objects in accordance with a function of relative motion, size and variance parameters associated with corresponding objects in the corresponding object plane; and coding said shape information for each object according to a mask;

size converting each macroblock of each said object for encoding according to a predetermined conversion ratio;

reconstructing the original size of each said macroblock;

determining a conversion error for each pixel block within said macro block;

comparing said conversion errors to a predetermined threshold to identify error pixel blocks; and increasing said conversion ratio and redetermining conversion errors and comparison thereof to said threshold until said threshold is not exceeded or until a maximum conversion ratio is reached.

15. The method of claim 14 and further comprising:

setting s aid variable rate for encoding at one of at least a higher rate and a lower rate to avoid overflow of said buffer while preserving image quality.

16. The method of claim 15 wherein said setting of said variable rate is determined by counting a number of consecutive skipped frames in a time interval immediately preceding said setting step.

17. The method of claim 16 wherein said function of relative motion, size and variance parameters includes a variable proportional to the square of a mean absolute difference value.

18. The method of claim 17 wherein said function is:

$$T[i]=W_m*MOT[i]+W_s*SIZE[i]+W_v*MAD^2[i]$$

where MOT[i], SIZE [i] and MAD[i] denote the relative ratios of motion, size and mean absolute difference parameters and $W_m$, $W_s$, and $W_v$ are weights which satisfy the expression $$W_m+W_s+W_v=1.$$

19. The method of claim 18 wherein $W_v$ is selected at a lower value and a higher value when said encoding rate is said lower rate and said higher rate, respectively.

20. A method of adaptively encoding a sequence of frames of image information, wherein at least some of said frames contain a plurality of video objects, for providing a compressed video signal to a transmission channel by means of a buffer having a variable input bit rate and a substantially constant output bit rate comprising the steps of:

encoding each of said video objects in each of a set of frames using coding means including a processor for performing discrete cosine transform to produce transform coefficients and a quantizer for quantizing the transform coefficients to generate image-representative code bits at a variable rate, said encoding step producing texture, motion and shape information for each said video object;

storing said image representative code bits in said buffer;

restricting the contents of said buffer with respect to a predetermined limit value by adjusting quantization parameters utilized by said quantizer with respect to a reference value according to a quadratic rate distortion model to increase or decrease the amount of code bits generated by said coding means for said video objects in successive ones of said frames;

setting said variable rate for encoding at one of at least a higher rate and a lower rate to avoid overflow of said buffer while preserving image quality;

size converting said shape information for each macroblock of each said object according to a predetermined conversion ratio;

determining a conversion error for each pixel block within each said macro block;

comparing said conversion errors to a predetermined Alpha threshold to identify error pixel blocks;

increasing said conversion ratio and redetermining conversion errors and comparison thereof to said Alpha threshold until said Alpha threshold is not exceeded or until a maximum conversion ratio is reached;

skipping the coding of a frame for a frame period whenever the difference between buffer bit capacity and current buffer level is less than a predetermined margin at the end of the encoding of all video objects in a frame;

said setting of said variable rate being determined by counting a number of consecutive skipped frames in a time interval immediately preceding said setting step, said variable rate being set at said higher rate when said number of skipped frames is less than a predetermined number and being set at said lower rate when said number of skipped frames is equal to or greater than said predetermined number;

after encoding, determining whether said higher rate or said lower rate is operative; and increasing said Alpha threshold if said lower rate is operative and decreasing said Alpha threshold if said higher rate is operative for a succeeding coding interval.

21. The method of claim 20, wherein:

said Alpha threshold is set initially at a value substantially midway between zero and a maximum value.

22. The method of claim 20, wherein:

said Alpha threshold is increased in value in increments of a first predetermined level and is decreased in value in decrements of a second predetermined level.

23. The method of claim 21, wherein:

said increment level is less than said decrement level.

24. The method of claim 20 and further comprising:

estimating a target number of bits for encoding each video object in each successive frame in a sequence occurring over a predetermined time interval following the first frame by distributing a target number of bits for all objects in each video object plane among said objects in accordance with a function of relative motion, size and variance parameters associated with corresponding objects in the corresponding object plane.

* * * * *